Patented June 20, 1950

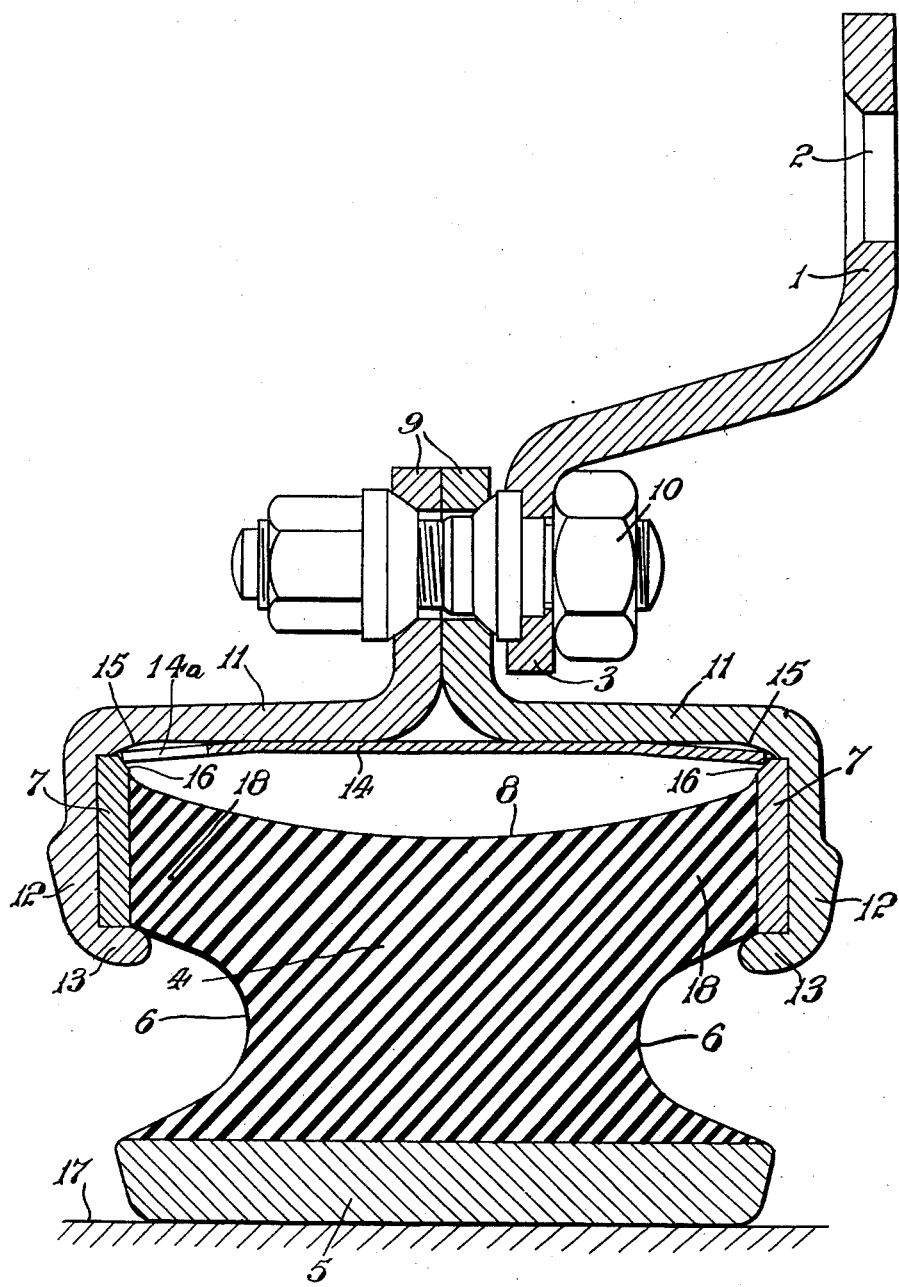

2,511,922

UNITED STATES PATENT OFFICE 2,511,922

RESILIENT WHEEL FOR VEHICLES

Bernard William Deacon Lacey, Birmingham, and Harry Richard Willcocks, Cheslyn Hay, near Walsall, England, assignors to Dunlop Rubber Company Limited, London, England, a British company Application October 27, 1945, Serial No. 624,974
In Great Britain November 1, 1944

6 Claims. (Cl. 152—325)

1

Our invention relates to improvements in or concerning resilient wheels for vehicles especially endless track vehicles, railway rolling stock and other heavy vehicles the wheels of which are required to operate under heavy load and restricted space conditions.

The invention has for its object to provide a resilient vehicle wheel which is stable under high loads and of a cushioning capacity readily adjusted to varying requirements.

According to this invention a resilient wheel comprises a rigid tread an annular element of resilient material bonded to said tread, a pair of rigid rings bonded to opposite sides of the said annular element and extending over a portion only of the thickness of the said element near to the inner diameter thereof, a wheel body and means for attaching the said rigid rings to the said wheel body. Preferably the attachment means comprise a circumferentially divided rim each part of said rim having a radial portion securable to the said wheel body said rim parts each having a radial flange embracing one of the said rigid rings.

The inner periphery of the said annular element is preferably of concave section towards the attachment means and the sides of the said annular element are recessed axially inwardly towards one another between the rigid rings and rigid tread.

It may be desirable to insert a thin rigid annular band or the like between the two rigid rings in order to prevent the rings from moving inwardly towards each other.

In order that the invention may be more easily understood and readily carried into effect the same will now be described with reference to the accompanying drawings showing a part sectional view of a wheel constructed in accordance with the invention.

Referring to the drawings a convenient embodiment of a wheel constructed in accordance with the invention comprises a wheel body in the form of a dished load supporting disc 1 provided around its centre with bolt holes 2 for the attachment of the disc to the permanent hub of the vehicle.

The periphery of the load supporting disc is provided with a radial flange 3 to which is bolted attachment means 11 carrying an annular resilient element 4 of rubber or the like, said element having bonded to its outer diameter surface a rigid metal tread 5 which protects the resilient element from damage. Each side wall of the resilient element is axially recessed at 6 adjacent

2 the rigid tread and has bonded thereto one of a pair of rigid metal rings 7 of rectangular cross-section which are co-axial with the rigid tread and extend in a radial direction for a portion only of the thickness of the annular resilient element, namely that portion between the recesses 6 and the attachment means 11. The axial recesses 6 in the resilient element may be circumferentially continuous and of semi-elliptical section and extend towards each other from opposite sides of the element between the rigid rings 7 and the tread 5 to an axial depth, for example, of the order of one fifth of the overall width of the annular resilient element. The radial depth of the recesses at the side wall surface of the annular resilient element may be substantially equal to the depth of the rigid rings bonded 7 thereto, but may be varied to suit the deflection required.

The inner diameter surface 8 of the resilient annulus remote from the tread is preferably of a section which is concave over its full width towards the attachment means so that such surface is normally spaced from the attachment means but adapted to contact therewith under overload.

The attachment means comprise a circumferentially divided rim the parts of which have contiguous radial portions 9 bolted at 10 to the radial flange 3 of the wheel body 1, said radial portions merging into the half rim parts 11 of the attachment means which extend axially outwards in opposite directions from the midplane of the wheel.

The axially extending half rim parts 11 terminate on opposite sides of the wheel in radial flanges 12 each having an axially inturned shoulder 13 at its edge, these flanges and shoulders each embracing one of the rigid rings 7 bonded to opposite sides of the resilient element 4.

In order to prevent the rigid rings 7 from moving inwardly towards one another the half rim parts 11 are recessed sufficiently on their greater diameter surfaces to accommodate a spacing band 14 of slightly greater axial width than the recess so provided. The ends of the recess are slightly curved at 15 in section, and the edges of the spacing band may be split transversely of the band at intervals along the periphery thereof, as indicated at 14ᵃ in the drawing, so that on bolting the half rim parts 11 together the split edges of the spacing band are each bent radially by the curved ends of the recess into contact with a bevelled edge 16 formed on the periphery of each of the rigid rings 7.

When load is applied to the rigid tread 5 as by contact with the ground 17 or an endless track equivalent thereto the rubber of the resilient element is compressed at the bottom of the wheel, the rubber at the top of the wheel diametrically opposite being extended radially. Those portions of the resilient element occupying positions at right angles to the line of application of the load are stressed in shear, and the laterally projecting side wall portion 18 of the resilient element to which the rigid annular rings 7 are bonded are also stressed in shear at all times. By adjusting the dimensions of the laterally projecting side wall portions 18 a wide range of deflection can be obtained without impairing lateral stability. Excess loads are radially cushioned by compression of the resilient element 4 between the rim parts 11 of the attachment means and the rigid tread member 5 the protective action of which facilitates the use of synthetic rubber.

Having described our invention, what we claim is:

1. A resilient wheel comprising a rigid tread, an annular element of resilient material bonded to said tread, a pair of spaced rigid rings extending over and bonded to a portion of the thickness of said annular element near the inner diameter thereof to support said annular element, a circumferentially divided rim having marginal portions embracing and supporting said rigid rings and a metal spacing band between and contacting said rigid rings at their inner peripheries, the inner periphery of said resilient element being normally out of contact with said divided rim and said metal spacing band intermediate said rings.

2. A resilient wheel according to claim 1 in which said metal spacing band is notched transversely at its edges and engages with the marginal portions of said divided rim to spring outwardly into contact with the inner edges of said rigid rings.

3. A resilient wheel according to claim 1 wherein the annular element is recessed laterally between the rigid tread and the rigid rings.

4. A resilient wheel comprising a pair of laterally spaced annular rigid rings, an annular element of resilient material having side faces bonded to said spaced rigid rings, said annular element of resilient material having an inner peripheral face arched radially outwardly between said rigid rings and having side faces extending laterally inwardly of said rigid rings and spaced outwardly of the inner periphery to a peripheral face of said annular element, a rigid tread bonded to the outer peripheral face of said annular element and a rim engaging and holding said rigid rings in fixed spacial position and spaced from the arched portion of said annular element.

5. A resilient wheel comprising a pair of laterally spaced rigid rings, an annular element of resilient material having side faces bonded on their radially inner margins to said rigid rings and extending from the outer part of said margins laterally inwardly and thence radially outwardly to a peripheral surface, a rigid tread bonded to said outer peripheral surface of said annular element, the inner peripheral face of said annular element being arched outwardly from the inner edges of said margins and a rim securing said rigid rings in fixed spacial relation and spaced radially inwardly of the arched portion of said annular element of resilient material.

6. The wheel of claim 5 in which the side faces of said annular element radially outward of said margin portions are reversely curved inwardly and then outwardly to form an annular recess on each side between said rigid rings and said rigid tread.

BERNARD WILLIAM DEACON LACEY.
HARRY RICHARD WILLCOCKS.

REFERENCES CITED

The following references are of record in the file of this patent:

UNITED STATES PATENTS

| Number | Name | Date |
|---|---|---|
| 449,281 | Challiner | Mar. 31, 1891 |
| 1,140,752 | Leonard | May 25, 1915 |
| 1,294,796 | Harding | Feb. 18, 1919 |
| 1,557,324 | Pestunowitz | Oct. 13, 1925 |
| 2,393,161 | Haushalter | Jan. 15, 1946 |